United States Patent [19]
Morris

[11] 3,813,744
[45] June 4, 1974

[54] GEOPHONE TREATMENT
[75] Inventor: Harold B. Morris, Houston, Tex.
[73] Assignee: Seismic Logs, Inc., Houston, Tex.
[22] Filed: Dec. 8, 1972
[21] Appl. No.: 313,496

[52] U.S. Cl............ 29/25.35, 310/8.4, 340/8 LF, 340/10, 340/17
[51] Int. Cl............................................ B01j 17/00
[58] Field of Search............ 340/17, 10, 8 R, 8 LF; 29/25.35, 595; 310/8.4

[56] References Cited
UNITED STATES PATENTS

| | | | |
|---|---|---|---|
| 3,555,503 | 1/1971 | Morris | 340/17 |
| 3,688,251 | 8/1972 | Morris | 340/17 |
| 3,749,948 | 7/1973 | Morris | 340/10 |

Primary Examiner—Charles W. Lanham
Assistant Examiner—Carl E. Hall
Attorney, Agent, or Firm—Richards, Harris & Medlock

[57] ABSTRACT

Disclosed is a method of manufacturing a motion sensitive detector of the type having a cylindrical chamber, a transducer, and an inflated envelope. In the method the receptacle is first filled by weight with an acoustic transmission compound and thereafter the transducer and inflated envelope are mounted in the receptacle. The receptacle is vented to the atmosphere and centrifuged to degas the acoustic transmission compound. Next, air is evacuated from the top of the receptacle and the receptacle is sealed. The inflated envelope is then evacuated and the centrifuge process repeated with the receptacle sealed to form a void in the top of the receptacle about 0.1 to 0.2 inches high.

18 Claims, 2 Drawing Figures

PATENTED JUN 4 1974 3,813,744

GEOPHONE TREATMENT

BACKGROUND OF THE INVENTION

In some seismic exploration systems, motion sensitive detectors called geophones are connected to the earth to detect its vibrations. Often pressure sensitive detectors, such as piezoelectric crystals, are placed in a chamber along with some type of mass. During earth vibrations, vertical acceleration of the geophone causes the mass to apply pressure to the detectors which generate a signal proportionate to the sensed motion. Examples of this type of geophone are disclosed in U.S. Pat. Nos. 3,489,997, 3,555,503, and 3,688,251.

In these geophones, sensitivity without instrument resonance is especially important to accurately characterize the reflecting boundaries, and therefore manufacturing processes which increase the ultimate sensitivity and eliminate resonance of the geophone are very desirable.

SUMMARY OF THE INVENTION

The present invention relates to improvements in the sensitivity of geophones and more particularly to a method of manufacturing a geophone of the type having a motion sensitive transducer suspended in acoustic transmission fluid in a sealed receptacle, wherein the resultant sensitivity without resonance of the geophone is increased.

In accordance with the present invention, the receptacle is evacuated, sealed and thereafter subjected to acceleration forces for a period of time to cause any discontinuities or voids in the acoustic transmission fluid to migrate to the top of the receptacle and balance the void formed by the flexible envelope located at the bottom of the receptacle.

BRIEF DESCRIPTION OF THE DRAWINGS

The invention and the attendant advantages thereof will be readily appreciated by reference to the following description taken in conjunction with the accompanying Drawing in which.

DESCRIPTION OF THE PREFERRED EMBODIMENT

Figure 1:
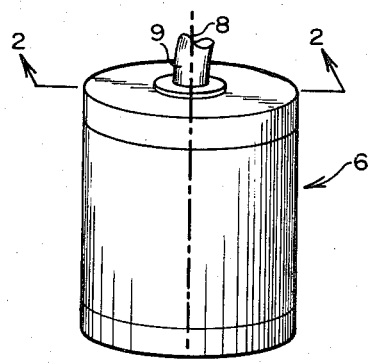
FIG. 1 is a perspective view of a geophone manufactured in accordance with the process of the present invention.

Referring now to the drawings, wherein like reference characters designate like or corresponding parts, there is shown in FIG. 1 a cylindrical geophone 6, having a directional axis 8. This geophone 6 is of the type which can be connected to the earth by plaster of Paris, or the like, and will generate electrical signals in response to vibrations in the earth. The geophone 6 can be provided with a shielded electrical cable 9 for connection to recording and monitoring instruments.

Figure 2:
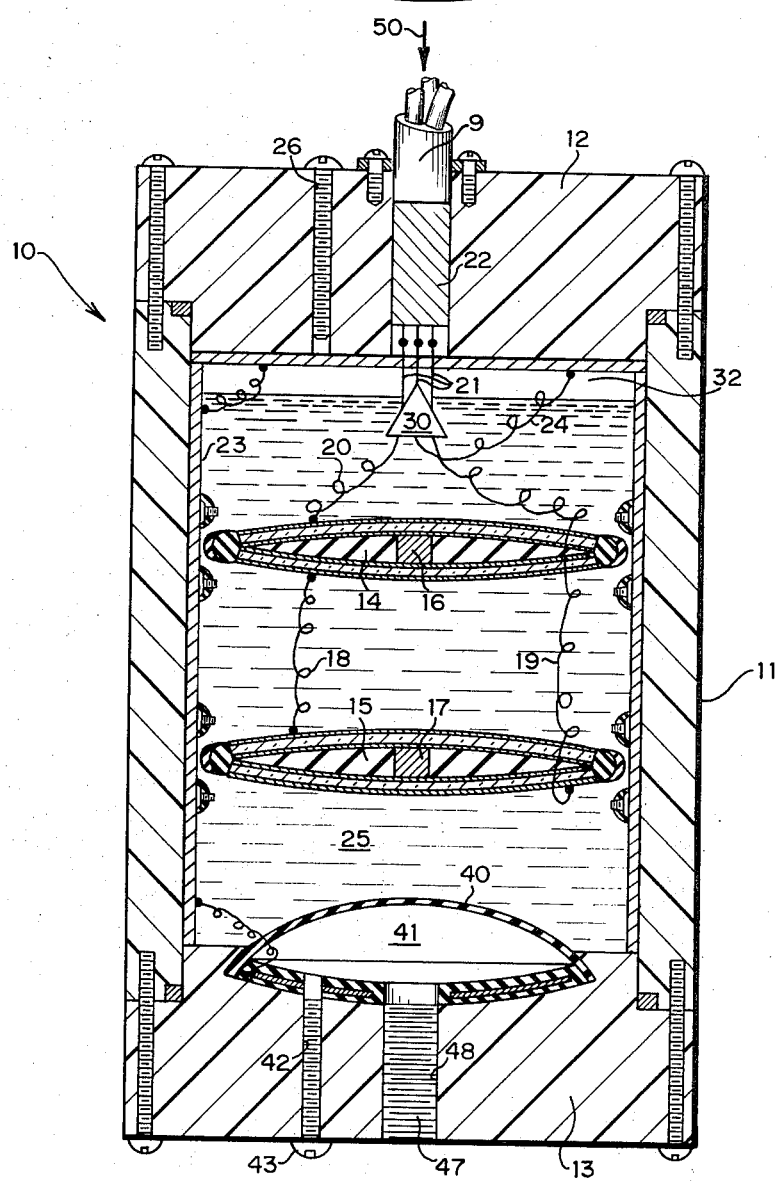
FIG. 2 illustrates an axial section of the geophone, taken on line 2—2 of FIG. 1, looking in the direction of the arrows.

Referring now to FIG. 2, a receptacle 10 is formed by casing 11, top closure 12, and bottom closure 13. The top and bottom closure members are attached to the casing 11 by means of suitable fasteners. Two pairs of crystal discs or motion sensitive transducers 14 and 15 are mounted as detectors within the cylindrical chamber in receptacle 10. Each pair of discs 14 and 15 are bowed opposite of each other to increase crystal sensitivity. The crystal discs 14 and 15 are electrically connected together by metal shims 16 and 17 and by an electrical conductor or wire 18. The electrical output of crystal discs 14 and 15 is conducted by leads 19 and 20 to amplifier 30. Leads 21 conduct the output of amplifier 30 through a plug 22 to shielded cable 9 and a suitable device for storing or recording the signals. The shield (not shown) of the cable 9 is connected to the low side of the leads 21.

The inner walls of housing 10 are lined with copper 23 to provide a shield as well as a ground terminal for amplifier 30 by way of conductor 24. The interior of receptacle 10 is filled with a fluid silicone acoustic transmission compound 25 which protects the unit against shock, acts as a hydraulic restraint, and provides a weight or mass against which the crystal pairs 14 and 15 may work.

For a more specific description of the above-mentioned portions of the invention, reference is made to U.S. Pat. Nos. 3,489,997, 3,555,503, and 3,688,251.

A flexible envelope 40, preferably formed from silicone rubber, is secured by a suitable adhesive to the bottom closure 13. The envelope 40 forms a cavity 41 sealed from the fluid 25. Cavity 41 can be inflated or evacuated to vary the size thereof. Evacuation is effected through passage 42 in bottom closure 13. Passage 42 can be sealed with a suitable bolt 43. Typically a threaded 4-40 bolt might be used in the threaded passageway. A cover or plug 47 permanently seals threaded channel 48 to maintain an air-tight cavity 41.

In the process of manufacturing the geophone 6, the bottom closure 13 and envelope 40 in an inflated condition are attached to the casing 11 and the chamber in the casing is filled with a specific amount of compound 25, preferably G.E.'s Insulgrease G640 or G641. The amount of compound 25 used is measured by weight. The discs 14 and 15 are mounted in the casing 11 as shown. Closure 12 with vent hole 26 open, is fastened in place, and geophone 6 is placed on a centrifuge for degassing of the compound 25. The geophone 6 is then subjected to acceleration forces on the centrifuge with the geophone's directional axis 8 colined with the direction of acceleration of the centrifuge and with forces of acceleration operating on the geophone in the direction of arrow 50. This process causes air suspended in compound 25 to move to the top of the chamber of receptacle 10 and form an air pocket 32 from 0.1 to 0.2 inches high. The size of this air pocket 32 can be controlled by controlling the amount of compound 25 originally injected into receptacle 10. The air pocket 32 is next evacuated through vent hole 26 to a pressure of approximately 30 inches of mercury.

The vent hole 26 is then plugged to maintain the decreased pressure and the geophone 6 is inverted while bolt 43 is removed opening cavity 41 of envelope 40. A vacuum is then applied to passageway 42 while the geophone 6 is inverted. A negative pressure of approximately 30 inches of mercury has been found sufficient. Passageway 42 is then closed by bolt 43 to maintain the vacuum in cavity 41.

After passageway 42 is closed the geophone 6 is again placed in a centrifuge with the geophone's directional axis 8 collinear with the direction of acceleration of the centrifuge, and with the forces of acceleration operating on the geophone 6 in the direction of arrow 50. It has been found that an acceleration of 260 G's for a period of 3 minutes is sufficient to provide a void 32 of 0.1 to 0.2 inches at the top of the receptacle 10 to balance the partitioned void formed in the envelope 40.

In effect, these two decoupling low pressure voids prevent transmission of vertical forces created by motion from the top and bottom of the case to the discs 14 and 15. This leaves only the cylindrical walls 23 to transmit forces to the periphery of discs 14 and 15 opposed by the mass inertia of the discs thus creating a diaphragm type transducer action.

In operation the geophone 6 can be coupled to the earth by means of plaster of Paris, or the like. Seismic motion is sensed by the pressure of compound 25 against crystal discs 14 and 15. This motion is converted to electrical signals and amplified by amplifier 30. The absence of air in cavity 41 and the establishment of a void 32 in compound 25 at the top eliminates resonance and increases the sensitivity of the geophone 6 to seismic vibrations.

Having described the invention in connection with certain specific embodiments thereof, it is to be understood that further modifications may now suggest themselves to those skilled in the art, and it is intended to cover such modifications as fall within the scope of the appended claims.

What is claimed is

1. A method of manufacturing a motion sensitive detector, comprising the steps of:
   locating a pressure sensitive transducer in a cavity of a receptacle;
   filling said cavity with acoustic transmission fluid;
   sealing said cavity;
   migrating air suspended in said acoustic transmission fluid to one end of said cavity; and then
   evacuating air from said cavity.

2. A method as defined in claim 1 wherein said cavity is evacuated to at least a negative pressure of approximately 30 inches of mercury.

3. A method as defined in claim 1 wherein the receptacle is subjected to acceleration forces by rotating the receptacle on a centrifuge.

4. A method as defined in claim 1 wherein the receptacle is subjected to at least 260 times gravitational acceleration.

5. A method for increasing the performance of a motion sensitive detector having a pressure sensitive transducer mounted in a sealed cavity of a receptacle, and wherein said cavity is filled with acoustic transmission fluid, comprising the steps of:
   subjecting said receptacle to acceleration forces in excess of gravity; and then
   evacuating air from said cavity.

6. A method as defined in claim 5 wherein said cavity is evacuated to at least a negative pressure of approximately 30 inches of mercury.

7. A method as defined in claim 5 wherein the receptacle is subjected to acceleration forces by rotating the receptacle on a centrifuge.

8. A method as defined in claim 5 wherein the receptacle is subjected to at least 260 times gravitational acceleration.

9. In a method for manufacturing a motion sensitive detector having a pressure sensitive transducer mounted in a sealed cavity of a receptacle, and wherein said cavity is filled with acoustic transmission fluid,
   the improvement which comprises, subjecting said receptacle to acceleration forces in excess of gravity to cause air suspended in said acoustic transmission fluid to migrate to one end of said cavity prior to evacuating air from said cavity.

10. A method as defined in claim 9 wherein said cavity is evacuated to at least a pressure of approximately 30 inches of mercury.

11. A method as defined in claim 9 wherein the receptacle is subjected to acceleration forces by rotating the receptacle on a centrifuge.

12. A method as defined in claim 9 wherein the receptacle is subjected to at least 260 times gravitational acceleration.

13. A method of manufacturing a motion sensitive detector, which comprises the steps of:
   filling an open-ended receptacle with acoustic transmission fluid;
   placing a variable volume envelope in the cavity of the open-ended receptacle;
   placing at least one pressure sensitive transducer in the receptacle;
   enclosing the open-ended receptacle;
   subjecting the receptacle to acceleration forces in excess of gravity to form an air pocket at one end of said cavity;
   applying a vacuum to remove air from said air pocket in the receptacle;
   sealing said cavity;
   decreasing the volume of the envelope; and
   creating a void at one end of said cavity by subjecting said receptacle to acceleration forces in excess of gravity.

14. A method as defined in claim 13 wherein said cavity is evacuated to at least a negative pressure of approximately 30 inches of mercury.

15. A method as defined in claim 13 wherein the receptacle is subjected to acceleration forces by rotating the receptacle on a centrifuge.

16. A method as defined in claim 13 wherein the receptacle is subjected to at least 260 times gravitational acceleration.

17. A method of manufacturing a motion sensitive detector, which comprises:
   filling a cavity of a receptacle with acoustic transmission fluid;
   locating a pressure sensitive transducer in the cavity at a position intermediate the ends thereof;
   forming an air pocket between said acoustic transmission fluid and one end of said cavity; and then
   evacuating air from the cavity.

18. A method as defined in claim 17 comprising the additional step of forming another void between the acoustic transmission fluid and the other end of said cavity.

* * * * *